Figure 1:
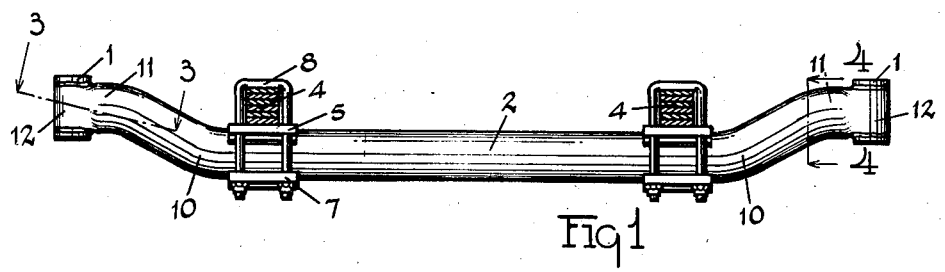

Oct. 15, 1940.  B. H. URSCHEL  2,218,127
AUTOMOTIVE VEHICLE AXLE
Filed April 4, 1938  3 Sheets-Sheet 1

Inventor
Bertis H. Urschel
By Faust H. Crampton
Attorney

Oct. 15, 1940.  B. H. URSCHEL  2,218,127
AUTOMOTIVE VEHICLE AXLE
Filed April 4, 1938   3 Sheets-Sheet 2
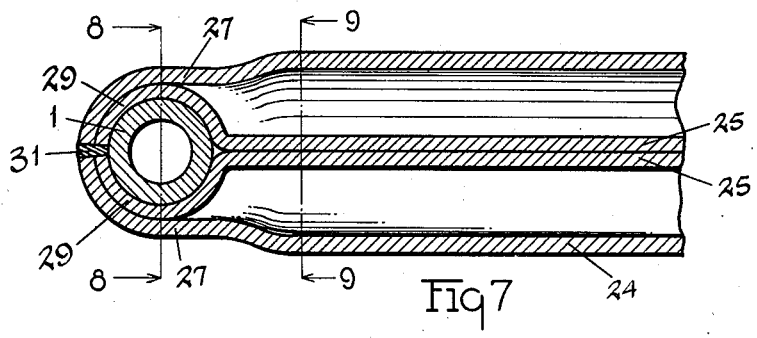
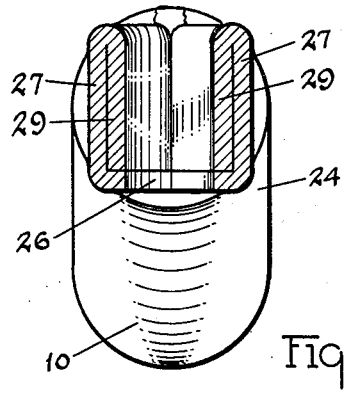
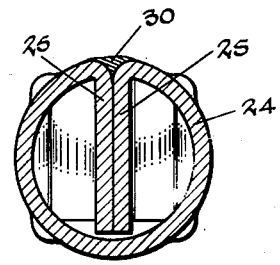
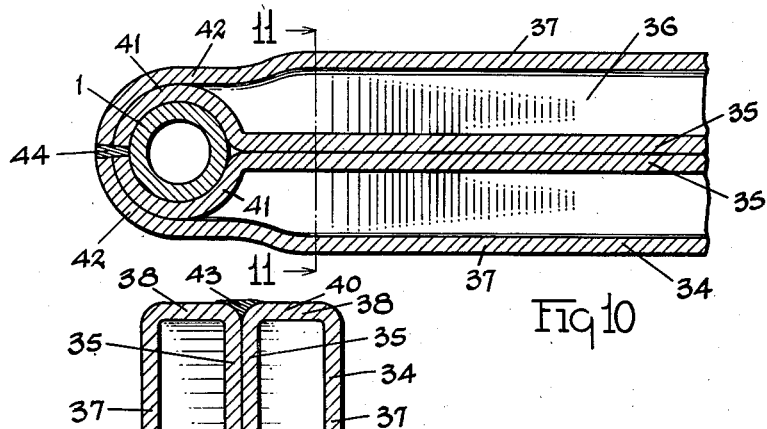
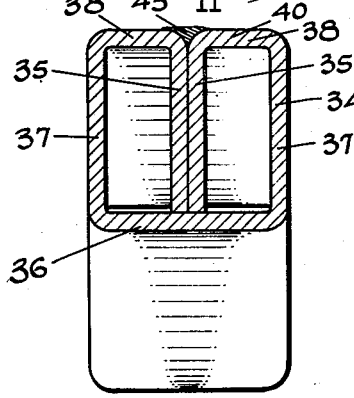
Inventor
Bertis H. Urschel
By Frank H. Crampton
Attorney Oct. 15, 1940.    B. H. URSCHEL    2,218,127
AUTOMOTIVE VEHICLE AXLE
Filed April 4, 1938    3 Sheets-Sheet 3
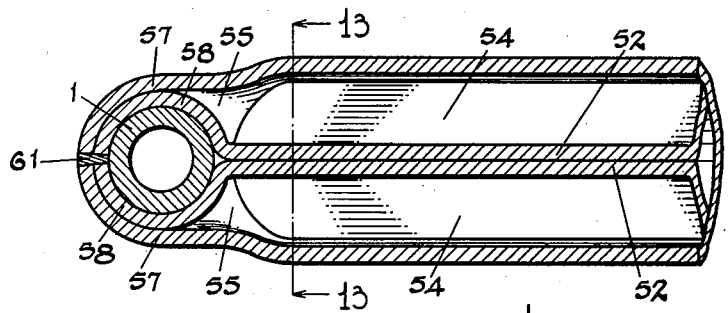
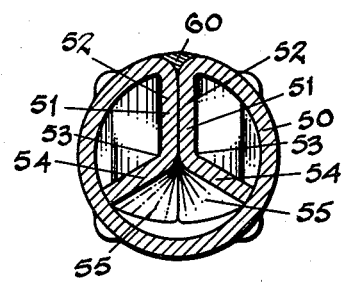
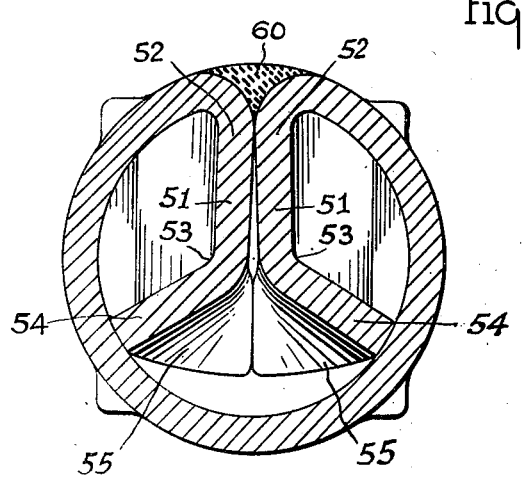
Inventor
Bertis H. Urschel
By
Attorney Patented Oct. 15, 1940

2,218,127

UNITED STATES PATENT OFFICE 2,218,127

AUTOMOTIVE VEHICLE AXLE

Bertis H. Urschel, Bowling Green, Ohio, assignor to The Urschel Engineering Company, Bowling Green, Ohio, a corporation of Ohio Application April 4, 1938, Serial No. 199,897

9 Claims. (Cl. 301—124)

My invention relates to axles for automotive vehicles. The invention has for the object to produce light-weight, sheet metal axles having parts that are shaped, located, and interconnected in such a manner as to withstand exceedingly great torque stresses and load strains, to which such axles are subjected to, when in use.

The invention also has for its object to provide in axles, hollow sheet metal torque resisting parts and strut parts, the strut parts extending crosswise the interior of the axle to efficiently coact with the torque resisting parts to resist shearing stresses and bending strains.

The invention also provides a longitudinally extending sheet metal part located within the axle in the plane of the lines of direction in which the normal load presses against the axle.

The invention also provides in hollow axles load sustaining parts that are so formed and connected to enable slight deflection that is elastically resisted up to a certain point and thereafter positively resisted to prevent permanent deformation. The invention, thus, provides means for producing yieldability to sudden loads or shocks, the axles coacting resiliently with the springs of vehicles to absorb ordinary shocks, and yet prevent permanent set or deformation of the axle that might otherwise be caused by excessively high axle-deforming forces.

The axles are, preferably, formed of sheet steel that can be heat treated and tempered and the welded parts normalized. The sheet metal blanks are cut and die-pressed to shape in forming the axles. The parts of the axles may be welded together along contacting portions, or the blanks may be die-pressed to form integrally connected parts.

The invention is particularly advantageously used when embodied in axles that are supported on stub axles of the guiding wheels of automotive vehicles, which direct the movement of the vehicles and wherein the axles are subjected to large torsional strains, as well as strains due to varying load.

Structures containing the invention may partake of different forms and may be varied in their details and still embody the invention. To illustrate a practical application of the invention, I have selected modified forms of axles as examples of the various structures that contain the invention and shall describe the selected structures hereinafter. The particular structures selected are shown in the accompanying drawings.

The axles selected as examples of embodiments of the invention are so formed that they may be produced at a low labor and material cost and constructed to produce a resistance to deformation thereof that is much in excess of other known forms of axles proportional to their weight.

Figure 2:
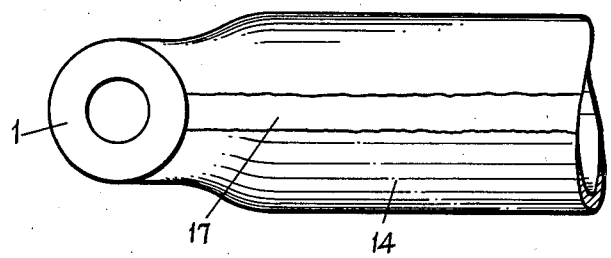
Figure 3:
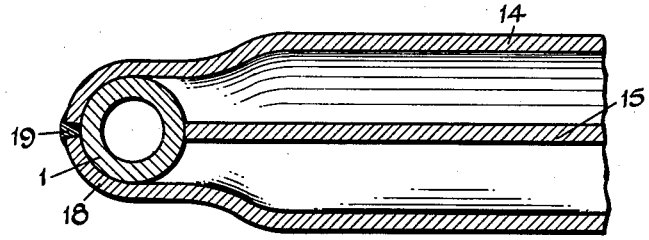
Figure 4:
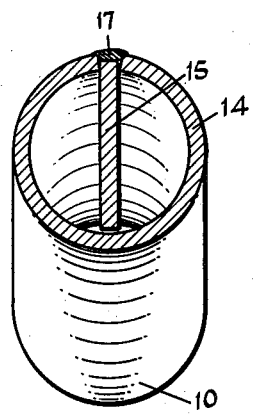
Figure 6:
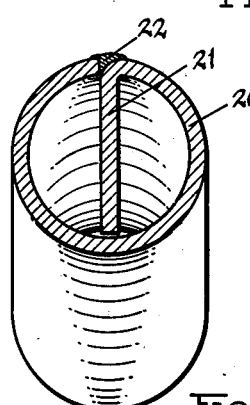
Figure 5:
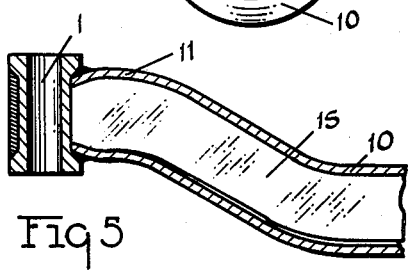

Fig. 1 of the drawings substantially illustrates a side view of each of the axles shown in the remaining figures of the drawings. Figs. 2, 3, and 4 illustrate one form of the axle. Fig. 2 is a top view of the said form of the axle. Fig. 3 is a longitudinal section of an end part of the axle shown in Fig. 2 in a plane, such as indicated at line 3—3 in Fig. 1. Fig. 4 is a transverse sectional view of the axle in a plane, such as indicated at 4—4 in Fig. 1. Fig. 5 illustrates a longitudinal, vertical substantially central section of the axle shown in Fig. 2. Fig. 6 illustrates a transverse sectional view of a modified form of the axle taken on a plane similar to that of the axle shown in Fig. 4. The top and longitudinal sectional views of the axle shown in Fig. 6 are like those of the same views in Figs. 2, 3, and 5, respectively. Figs. 7, 8, and 9 illustrate a further modified form of the axle embodying my invention. Fig. 7 is a view of a section of the axle on a plane of the axle, such as indicated by the line 3—3 in Fig. 1. Fig. 8 is a view of the section of an end part of the axle taken on the plane of the line 8—8 indicated in Fig. 7, except for the bushing shown in Fig. 7. Fig. 9 is a view of the section of the axle taken on the plane of the line 9—9 indicated in Fig. 7. The top view of the axle is like that of the axle shown in Fig. 2, and the vertical, longitudinal, substantially central sectional view is the same as that shown in Fig. 5. Figs. 10 and 11 show a fourth form of the axle embodying my invention. Fig. 10 illustrates a view of the section of the axle taken on the plane, such as that indicated by the line 3—3 in Fig. 1. Fig. 11 is a view of a section taken on the plane of the line 11—11 of the axle indicated in Fig. 10. The top view of the axle is similar to that of the axle shown in Fig. 2. Figs. 12 and 13 show a fifth form of the axle. Fig. 12 illustrates a view of a section of an end part of the axle on a plane, such as indicated by the line 3—3 in Fig. 1. Fig. 13 is a view of a section of the axle taken on the plane of the line 12—12 indicated in Fig. 11. A top view of the axle is similar to that of the axle shown in Fig. 2. Figure 14 illustrates an enlarged view of the axle shown in Figure 13 to show spacing of resilient parts which, however, is materially exaggerated as appears herein below.

The side views of each of the modified forms of the axle are substantially identical. They are secured to the vehicle by means substantially the same as that shown in Fig. 1. The axles are each formed from sheet steel of suitable thickness to give the required strength and the ends of each axle are provided with bearing sleeves or flanged bushings 1 for connecting stub axles thereto by means of king pins that extend through the bearing sleeves.

Each of the axles may be connected to the vehicles by means of the springs 4, which are connected to the chassis or frame of the vehicle. The springs are seated on saddles 5, and the springs and the saddles 5 are secured to the axle by means of the clamping members 7 and the U-bolts 8 in a manner well known in the art.

The ends of the axle, as is common, are shaped to receive the stub axles and to permit the required free pivotal movements of the stub axles. The ends of axles are formed rectangular and provided with tongues for receiving the stub axle bearing members. The tongues are bent around the bearings and welded to each other and to the bearings.

Each of the axles are shaped to lower the central portion 2 of the axle with respect to the stub axle bearings, and, consequently, they are bent, as indicated at 10 and 11, while maintaining the bearings located in end portions 12 of the axle, in the desired axially relatively inclined position to produce the desired balanced traction that aids in guiding the vehicle.

In the form of axle illustrated in Figs. 2, 3, and 4, sheet metal is cut and shaped to form a tubular outer wall 14 of the axle. The wall 14 is shaped to form the bends, such as the bends 10 and 11 indicated in Fig. 1. The ends 12 of the wall are reduced in their cross-sectional area and formed rectangular. The ends are also provided with end slots and tongues located contiguous to the slots. The tongues and slots are formed to tightly fit the bushings 1. When the bushings are inserted in the slots, the tongues are bent about the surface of the bushing to embrace the bushings in the manner heretofore done in connection with tubular axles.

A part 15 is also cut or otherwise shaped to conform substantially to the bent shape of the outer wall 14 and so as to extend within the wall and to the surfaces of the bushings 1 located in opposite ends of the axle. The sheet metal that forms the wall part of the axle is so shaped as to locate its edges in close proximity to each other. The part 15 has a width, such that the upper edge may be disposed intermediate the edges of the wall part and its lower edge spaced a short distance from the inner side surface of the wall, such as from one-sixteenth to three-sixteenths of an inch. Preferably, the part 15 is so formed and secured as to space the central portion located between the bends 10 from the lower side of the wall 14 and to dispose its lower end edge portions extending between the bends 10 and 11 in inclined relation to the lower part of the inner surface of the wall and to locate the lower end edge portions, between the bends 11 and the bushings 1, in contact with the lower side of the axle, as shown in Fig. 5. This forms a yielding structure that causes progressive engagement of the part 15 with the lower side of the wall 14 from the bushings inward to the springs, to progressively increase the resistance to the moment of the forces exerted by the wheels and the springs by progressive contact along the edge of the part 15 with the wall 14 as the moment increases and produces a rigid structure at the stub axle bearing members for transmission of the load to the stub axles. The part 15 forms a strut part that limits the yieldability of axle and prevents permanent deformation of the axle by excess loads.

The upper edge of the part 15 is preferably disposed to produce a small channel located intermediate the edges of the wall 14 and the strut part 15. The contiguous edge portions of the part 15 and the wall 14 are then welded together along the upper side of the axle, as at 17, where the strains exerted in sustaining the load are largely compressional. This locates the weld where it is least subject to fracture. When the bushings 1 are inserted in the slots formed in the rectangular end portions of the axle, the tongues 18 are bent around the bushings 1, and the ends of the tongues are welded together and to the bushings, as at 19.

When the axle has been secured to the vehicle, in the manner described above, the part 15 is disposed in the plane of the maximum pressure lines produced by the load on the vehicle. When the pressure increases, as for example, when the vehicle wheel strikes a bump or is dropped into a hole in the roadway, the axle will elastically give with an increasing yielding resistance as the lengths of the lower edge of the strut part 15 that engage the bottom side of the wall 14 increases.

The form of axle illustrated in Fig. 6 is very similar to the form of the axle shown in Figs. 2, 3, and 4. The sectional and top views of the axle shown in Fig. 6 are identical to the sectional and top views of the axle shown in Figs. 2, 3, 4, and 5. The axle, shown in Fig. 6, is formed by cutting a blank to form a wall part, such as the wall 20, and a flange part, such as the part 21 formed integral with the wall part. Also, suitable slots and tongues may be formed in the rectangular shaped ends of the wall part for securing the bushings 1 in the slots in the manner described in connection with the axle illustrated in Figs. 2, 3, and 4.

The blank is die-pressed to bend the part 21 substantially 90° and to cylindrically shape the wall 20 and diametrically dispose the flange part 21 with respect to the wall 20. The parts are then secured in their relation by welding the contiguous edge portions of the wall 20 and the inwardly extending flange part 21 along the upper side of the axle as by the weld indicated at 22. The axle may then be heated and during heat-treatment may be bent to the form shown in Fig. 1.

The inwardly extending flange part 21 has a length to extend from one bushing to the other and preferably has a width, such that in the final formation of the axle, the lower edge will be disposed in slightly spaced relation from the bottom side of the wall 20 to locate the lower edge of the flange 21 about one-eighth of an inch from the lower side of the wall 20, particularly throughout the length of the portion of the axle located intermediate the bends 10 indicated in Fig. 1. The lower edge of the part 21 preferably slopes toward the bottom side of the wall from the bends 10 to the bends 11 and contacts with the bottom side of the wall intermediate the bends 11 and the bushings, as in the axle shown in Fig. 5. The strut 21 produces a rigid structure at the end parts of the axle to transmit the changing load, to which the axle is subjected, to the stub axle and to the wheels.

In the form of axle illustrated in Figs. 7, 8, and 9, the sheet metal blank is cut to form a wall part, such as the wall 24, and two flange parts, such as the parts 25, that are formed integral with the wall part. Also, the blank is cut to form suitable slots 26 in the ends of the wall part for receiving the flanged bushings 1, and the side edges of, and the ends of the flange parts are shaped to form portions having widths for subsequent folding the ends of the flange parts to the side walls to form tongues of double thickness from the sheet metal for securing the bushings.

The blank is die-pressed to bend the parts 25 and to shape the wall 24 substantially cylindrical and diametrically dispose the flange parts with respect to the wall 24 and in contact with each other. The parts are then secured in fixed relation by welding the contiguous edge portions of the wall 24 and the inwardly extending parts 25 along the upper side of the axle, as at 30.

The end portions 27 of the wall, located on opposite sides of the slots 28, are shaped rectangular and the end portions 29 of the flange parts 25 are flared cylindrically to the end portions 27 of the wall 24 and parts of the end portions 29 are folded to the surfaces of the portions 27 and their lower edges are disposed in contact with edge portions of the slots 26 and form, thereby, tongues having thickness double that of the sheet metal from which the parts are cut, as illustrated in Fig. 8.

When the bushing 1 has been inserted in the rectangular end portions of the axle as thus formed, the tongues are bent about the bushing and welded thereto, as indicated at 31. The axle may then be shaped, when heated, to form the bends 10 and 11, such as indicated in Fig. 1 and may then be heat-treated to normalize all parts of the axle.

In the formation of the inwardly extending parts 24, the blank is preferably cut to have a width such that, when the axle is finally formed, the lower edges of the parts 25 will be slightly spaced from the bottom side of the wall 24, such as about one-eighth of an inch, particularly throughout the length of the central portion of the axle located intermediate the bends 11 indicated in Fig. 1. The lower edges of the parts 25, preferably, slope toward the bottom side of the wall part 24, beginning at the bends 11, and contact with the bottom side of the wall from the bends 11 to the bushings. The ends of the wall 24 and the ends of the parts 25 completely surround the flanged bushings 1 and produce a rigid structure at the ends of the axle through which the changing pressures due to variation of the load on the axle, as the vehicle starts and stops, or varies in its rate of movement.

In the form of axle illustrated in Figs. 10 and 11, the axle is formed by cutting a sheet metal blank to form a wall part and flange parts. The ends of the portions are also cut to form slots in the ends of the central end portions of the wall part for receiving the bushings 1 when the axle is finally formed. The blank is then die-pressed to shape the wall part rectangular in cross section and to locate the flange parts within the wall part and in contact with each other so as to divide the interior of the surrounding wall 34 into substantially like chambers and dispose the lower edges of the flange parts in contact with the lower side of the axle. The rectangularly formed wall 34 comprises the bottom wall part 36, that is engaged by the flanges 35, the side wall parts 37, and the parts 38 with which the flanges 35 are integrally connected. The parts 38 form the top wall 40.

The end portions of the axle are dimensionally reduced while maintaining the end portions rectangular in form and the end portions 41 of the flanges 35 are flared cylindrically to the end portions 42 of the side walls 37 of the axle and the end parts of the portions 41 and 42 are folded together and disposed about the slots formed in the ends of the bottom wall 36 in a manner similar to that employed in producing the construction shown in Fig. 8. The bushing 1 is then inserted within the slot and the tongues, having the double thickness formed by the portions 41 and 42, are bent cylindrically about the bushing. The axle is welded along the contiguous, integrally connecting edge portions of the flanges 35 and the wall parts 38, that is on the upper side of the axle, as at 43, and also at the ends of the tongues formed by the end portions 41 and 42 and to the bushing 1, as indicated at 44.

In the form of axle illustrated in Figs. 12 and 13, the sheet metal blank is cut to form a wall part, such as the wall 50, and two flange parts, such as the parts 51, that are formed integral with the wall part. Also, the blank is cut to form suitable slots in the ends of the wall part for receiving the flanged bushings 1 in the formation of the axle, and the side edges and the ends of the flange parts are shaped to form portions having widths for subsequent folding to form tongues of double thickness from the sheet metal for embracing the bushings when the parts have been shaped to form corresponding parts of the axle.

The blank is then die-pressed to bend the side parts 51 of the blank to form them into the portions 52 and 54 and also to bend the parts 51 along the lines of their juncture with the wall 50 to diametrically dispose the portions 52, when the wall part is bent cylindrically and dispose the lines of the bends 53 between the portions 52 and 54 substantially at the longitudinally axially extending line of the enclosing wall 50. This disposes the portions 52 and 54 substantially radially with respect to the wall part 50. Preferably, the parts 51 are so bent as to contact and connect with the wall 50 substantially at points arcuately spaced 120° apart. The parts 51 thus form bracing struts between different parts of the wall of the axle. If desired, the knees of the strut parts 51, formed by the bends along the lines 53, may be slightly spaced as about a sixteenth of an inch, as shown in Figure 14, somewhat exaggerated in proportion to the diameter of the automobile axle shown in the drawings. The spacing of the knees permits a limited resilient deformation of the wall 50 in response to changes of pressure occurring as the vehicle moves over the road, but which are brought together when extreme pressures are applied. This prevents bending of the axle sufficiently to produce a permanent set.

The ends of the portions 54, by die-pressing, are curvedly brought together, as at 55, and the end portions 57 of the axle are formed rectangular. The end portions 58 of the parts 81 are flared quadri-cylindrical to contact the sides of the rectangular end portions 57 and, with the portions 57, form tongues that are located contiguous to the slots formed in the ends of the axle substantially in the same manner as is done in connection with the axle shown in Fig. 8. The bushing 1 is then located within the slots formed in the ends of the axle and the tongues formed by the folded metal produced by the portions 57 and 58. The tongues are then bent about the bushing 1. The parts of the axle are secured together, as by welding, along the lines indicated at 60 and 61 and bent to conform to the axle shape shown in Fig. 1.

The wall 50 of the axle is thus interiorly greatly reinforced by the three-point bracing produced by the parts 51 that will withstand excessive loads. The use of the axle shown in Figs. 11 and 12 is of particular advantage by reason of the changing direction that the pressure lines of the load undergo during the change of the rate of movement of the vehicle, such as in sudden stopping of the vehicle or a sudden forward movement. The direction of the pressure thus applied during the movement of the vehicle is largely in a vertical direction, which is advantageously supported by the shape of the parts 51 and, moreover, when the rate of movement is changed, either to increase or decrease the speed of the vehicle or to produce a sudden stopping of the vehicle, the three-point engagement of the strut parts 51 with the wall 50 will locate the parts 51 in the plane of lines of pressure of the normal load and the parts 54 will be advantageously located with respect to the resultant pressures produced by the normal load pressures and the pressures produced by the change in speed either upon increase or upon decrease of the speed.

I claim:

1. A tubular axle for automotive vehicles, the axle having a member secured to one side of the axle wall and spaced a short distance from the side opposite to the said one side of the axle wall for limiting the deflection of the tubular wall of the axle by variation of the pressure produced by the load on the axle.

2. A tubular axle for automotive vehicles, a partitioning wall extending across the interior of the axle, one edge of the partitioning wall secured to the axle wall and the other edge of the partitioning wall spaced a short distance from the proximate innner surface of the axle.

3. A tubular axle for automotive vehicles, a partitioning wall extending longitudinally and across the interior of the axle, one edge of the partitioning wall secured to the axle wall and the longitudinal central portion of the other edge of the partitioning wall spaced a short distance from the proximate inner surfaces of the axle, and the end edge portions of the partitioning wall located in contact with the axle wall.

4. A tubular axle for automotive vehicles, a partitioning wall connected to the wall of the tubular axle and extending longitudinal and across the axle, one side edge of the partitioning wall having a portion spaced from and inclined to the proximate inside surface of the wall of the tubular axle for progressively engaging the wall as the load on the axle increases.

5. A tubular axle for automotive vehicles, a partitioning wall connected to the wall of the tubular axle along one side edge of the partitioning wall and extending longitudinally and across the axle, the central longitudinal portion of the other side edge of the partitioning wall spaced from the proximate inside surface of the axle wall, and the end edge portions of the partitioning wall inclined to the proximate inside surfaces of the wall of the tubular axle in a direction towards the end of the axle for progressively engaging the wall as the load on the axle increases.

6. An axle for automotive vehicles, stub axle bearing members secured in the ends of the axle, a partitioning wall having a part located in the plane of the axes of the bearing members and extending from one bearing member to the other and across the interior of the axle, and the bottom edge of the partitioning wall spaced a short distance from one side of the axle.

7. A tubular axle for automotive vehicles, the ends of the axle wall formed to have parallel sides and having tongues, a diametrically extending wall, the ends of the diametrically extending wall having parts flared within the tongues of the axle wall, and stub axle bearing members embraced by the tongues and the ends of the said parts.

8. A tubular axle for automotive vehicles, a partitioning wall located within the axle and connected to the one side of the wall of the tubular axle and extending longitudinally and across the axle, one side edge of the partitioning wall having end portions spaced from and inclined to the proximate inside surfaces of the side of the wall opposite the said one side of the wall of the tubular axle for progressively engaging the said opposite wall as the load on the axle increases.

9. An automotive vehicle axle having a sheet metal space-enclosing wall and a pair of partitioning wall parts located in contact with each other and having parts extending transversely and longitudinally with respect to the enclosing wall part, the ends of the axle having parallel opposite side parts and the ends of the partitioning wall parts flared and folded against the sides and the ends of the enclosing wall and forming with the enclosing wall part tongues of double metal thickness, the upper and lower sides of the ends of the axle having openings and bearing members located in the openings and embraced by the tongues.

BERTIS H. URSCHEL.